(12) United States Patent
Wadman et al.

(10) Patent No.: US 10,337,657 B2
(45) Date of Patent: Jul. 2, 2019

(54) TUBULAR COUPLINGS AND CONNECTORS

(71) Applicant: Inspired Designs Limited, Isle of Man (GB)

(72) Inventors: Alexis Adrian Felip Wadman, Amstelveen (NL); Hendrikus Johannes Van der Meijden, Johannesburg (ZA)

(73) Assignee: Inspired Designs Limited, Isle of Man (GB)

( * ) Notice: Subject to any disclaimer, the term of this patent is extended or adjusted under 35 U.S.C. 154(b) by 339 days.

(21) Appl. No.: 14/917,826

(22) PCT Filed: Sep. 10, 2014

(86) PCT No.: PCT/IB2014/001781
§ 371 (c)(1),
(2) Date: Mar. 9, 2016

(87) PCT Pub. No.: WO2015/036836
PCT Pub. Date: Mar. 19, 2015

(65) Prior Publication Data
US 2016/0223113 A1    Aug. 4, 2016

(30) Foreign Application Priority Data

Sep. 11, 2013    (GB) .................................. 1316190.6

(51) Int. Cl.
*F16L 37/47*    (2006.01)
*F16L 33/22*    (2006.01)

(52) U.S. Cl.
CPC ............. *F16L 37/47* (2013.01); *F16L 33/226* (2013.01)

(58) Field of Classification Search
CPC ............... F16L 27/0837; F16L 27/0845; F16L 27/0841; F16L 37/47; F16L 33/226;
(Continued)

(56) References Cited

U.S. PATENT DOCUMENTS

| | | | |
|---|---|---|---|
| 4,842,059 A | * | 6/1989 | Tomek .................... E21B 17/05 166/242.2 |
| 5,050,841 A | | 9/1991 | Jacobsson |

(Continued)

FOREIGN PATENT DOCUMENTS

| | | | |
|---|---|---|---|
| DE | 2654784 | * | 7/1977 |
| EP | 0327494 A1 | | 8/1989 |

(Continued)

OTHER PUBLICATIONS

Search Report and Written Opinion for PCT/IB2014/001781 dated Feb. 10, 2015.

*Primary Examiner* — David Bochna
*Assistant Examiner* — James A Linford
(74) *Attorney, Agent, or Firm* — Remenick PLLC

(57) ABSTRACT

A tubular coupling comprising a first component (1) having a tubular male spigot (2) with a headed formation (3) on the outside thereof and extending towards one of its ends and a second component (5) has a socket for receiving the headed formation on the tubular male spigot in releasable manner. The second component has a flow passage (6) communicating with the socket generally collinearly with the tubular male spigot in the installed position. A seat (7) is provided in the inner surface of the socket so that it encircles an opening (8) where it communicates with the socket and the tubular male spigot has a resilient seal (9) for sealing an adjacent end of the tubular male spigot to the flow passage. The headed formation and socket are shaped to provide guide surfaces enabling introduction of the headed formation into the socket with the axis of the tubular male spigot extending transverse, typically at right angles, to the axis of a flow passage in the second component. The guide surfaces cooperate such that rotation of the first and second components to bring their axes into substantial alignment causes a seat and seal arrangement to become operative and the (Continued)

headed formation to be held captive relative to the socket. An adapter is provided for integrating the coupling with industry standard fittings.

12 Claims, 6 Drawing Sheets

(58) Field of Classification Search
CPC ... F16L 27/0853; F16L 27/0861; F16L 37/52; F16L 37/53
See application file for complete search history.

(56) References Cited

U.S. PATENT DOCUMENTS

| | | |
|---|---|---|
| 5,681,027 A | 10/1997 | Wuethrich |
| 5,950,985 A | 9/1999 | Petterson |
| 2002/0062872 A1 | 5/2002 | Makishma et al. |
| 2004/0051070 A1 | 3/2004 | Mikiya et al. |
| 2004/0239111 A1 | 12/2004 | Wuthrich |

FOREIGN PATENT DOCUMENTS

| | | | |
|---|---|---|---|
| EP | 0406203 A2 | 1/1991 | |
| EP | 1956280 A1 | 8/2008 | |
| GB | 1503647 A | 3/1978 | |
| WO | 85/05418 A1 | 12/1985 | |
| WO | 2005/075868 A2 | 8/2005 | |
| WO | WO-2013146989 A1 * | 10/2013 | ............ F16L 27/047 |

* cited by examiner

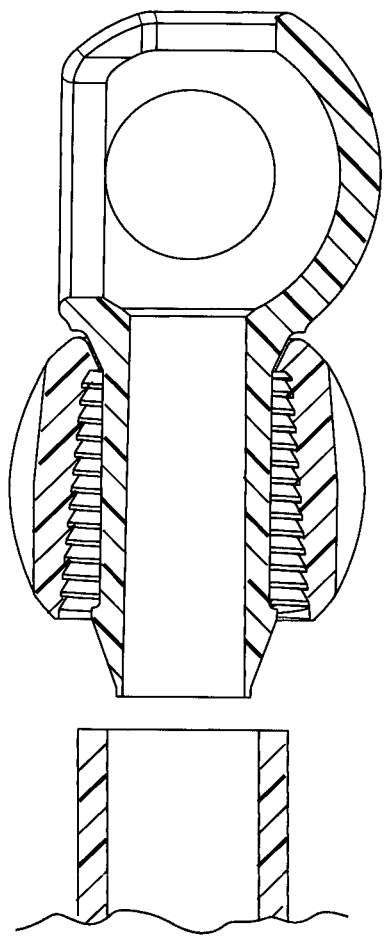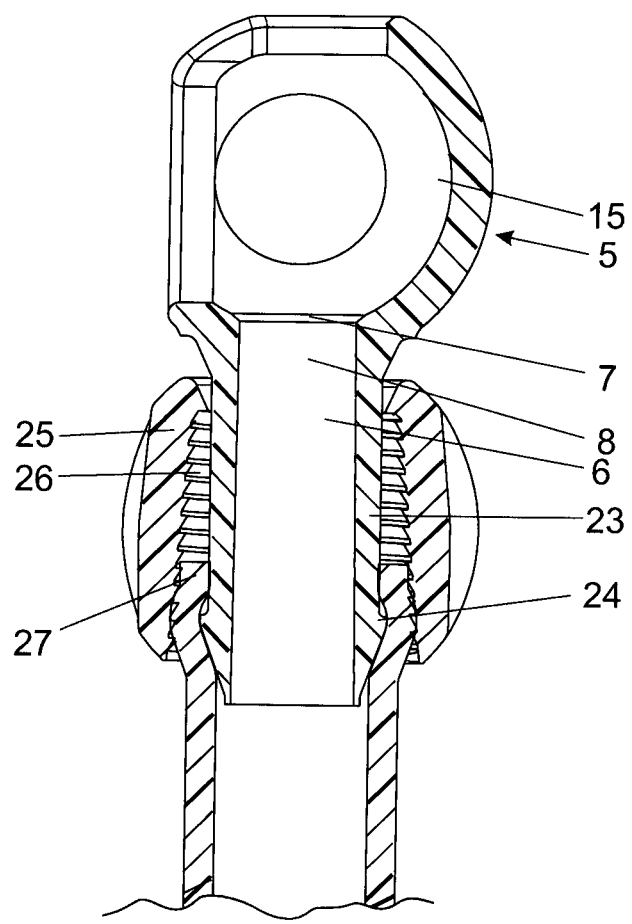
Figure 7
Figure 8

TUBULAR COUPLINGS AND CONNECTORS

REFERENCE TO RELATED APPLICATIONS

This application is a National Stage filing and claims priority to International Application No. PCT/IB2014/001781 of the same title, which was filed Sep. 10, 2014, and also claims priority to United Kingdom Application No. 1316190.6, which was filed Sep. 11, 2013.

FIELD OF THE INVENTION

This invention relates to tubular couplings and connectors that are used for attaching an elongated tube to a termination fitting that may assume the form of an attachment to a supply of fluid under pressure or to a delivery end at which fluid is to be delivered under pressure to a fluid distribution or fluid activated unit or machine.

The invention is particularly directed at quick release tubular couplings.

The invention is also particularly directed at tubular connectors that are simple to assemble onto an end of a tube that is deformable, at least to some extent.

It is envisaged that the invention will be primarily applicable to flexible tubes including garden hoses and hydraulic or pneumatic pressure hoses that are typically made of extruded plastics or other material that is frequently reinforced with fibrous strands that may be braided or simply wound around an inner layer of a multilayer construction. It is, however, also envisaged that the invention may be appropriate to somewhat more rigid tubes such as those made of copper or aluminium that is deformable to at least some extent.

The applicability of the invention to any tubes will depend, at least to a large extent, on the physical properties of the tube and also its outer surface. Especially in the case of more rigid tubes, the tolerances of its manufacture and of the couplings or connectors of the invention may determine whether or not to be invention is applicable.

BACKGROUND TO THE INVENTION

Numerous different proposals and constructions of couplings and connectors have been put forward from time to time and have been made available in the marketplace.

As regards garden hoses, one range of couplings and connectors that has become widely available and has in reality created an industry standard is the rather popular one that originated with the German company GARDENA AG and which is sold under their registered trade mark GARDENA®. Those hose couplings have a first component having a male tubular spigot encircled by an O-ring and wherein the spigot is introduced axially into a socket in a second component. The spigot has a shoulder behind which three symmetrically arranged releasable pawls associated with the socket engage to hold the spigot within the socket.

Release of the pawls is achieved by sliding an external spring biased skirt axially to release the pawls so that they can disengage the spigot and enable withdrawal of the spigot from the socket. The coupling thus has multiple components that need to be assembled. Also, the operation of the pawls is not always reliable and it is not always easy to cause the pawls to engage behind the shoulder when connecting such a coupling. Children or the elderly may battle with the strength that is sometimes required to make a proper connection. The second component is not adequately robust in that it does tend to break relatively easily and it does not cope with sand and grit very well.

The hose connector used in relation to such couplings has a first component that has a connector spigot with an undulating outer surface and a circular array of a multitude of gripper fingers spaced radially outwards from the spigot and that are urged towards the spigot in unison by a second component in the form of a union nut that has an internal screw thread cooperating with an external screw thread on the first component and a tapered surface that urges the gripper fingers inwards to clamp the hose firmly onto the spigot. The arrangement works well but does have some disadvantages in that the screw threads have given problems and can slip and also the gripper fingers can become loose and tend to be directed to the inside of a hose rather than the outside during installation of the hose.

Numerous other couplings and connectors have been proposed and used. For the most part the couplings are rather complex and the hose connectors for the most part employ a connector spigot extending into the hose that is firmly clamped onto the outside of the connector spigot by means of one form of clamp or another that may be releasable or permanent. Permanent connectors are generally made by crimping a sleeve or wires onto the outside of the hose whilst releasable connectors typically employ a screw operated clamp that encircles the hose.

Applicant is aware of various proposals that have been made to employ the characteristics of a ball valve in a coupling although none appear to have been made available commercially. Each of US20020062872, US20040239111, U.S. Pat. No. 5,050,841, EP406203 and GB1503647 describes the use of a ball in the form of a continuous sphere other than at positions where a single flow passage passes through the ball so that the only deviations of the outer surface of the ball are where the flow passage joins with the otherwise continuous spherical surface.

In all these instances the ball constitutes an additional component and the nature of the ball requires the part of the coupling that houses the ball to be made in at least two parts that need to be connected together. Further components may be needed to either enclose the ball to maintain it permanently captive or in some other way to make the coupling work properly.

U.S. Pat. No. 5,681,027 on the other hand describes a permanently installed right circular cylindrical element that is rotatable about an axis at right angles to the axis of the coupling in place of the spherical ball element. Nevertheless, the cylindrical element, which is an additional component, needs to be installed from a side of a body of the relevant component separately from any component of the coupling itself.

The designs of the various couplings and the number of components necessary to construct a coupling of any of these types, as far as applicant is concerned, result in the cost of the couplings becoming prohibitive for wide low cost applications such as to garden hose fittings or in other large-scale low cost applications. Cost is always an extremely important factor in the mass production and commercialisation of any product of this nature. Also, the designs of these couplings do not lend themselves to use under rugged conditions such as in a garden.

Applicant believes that there is room for improvement both in relation to the coupling as well as in relation to a hose connector that may in some instances be used together with such a coupling.

SUMMARY OF THE INVENTION

In accordance with a first aspect of this invention there is provided a tubular coupling comprising a first component having a tubular male spigot with a headed formation on the outside thereof and a second component having a socket for receiving the headed formation on the tubular male spigot in releasable manner and a flow passage communicating with the socket and generally collinearly with the tubular male spigot in the installed position by way of a cooperating seat and seal arrangement for sealing an adjacent end of the tubular male spigot to the flow passage where it communicates with the socket, the tubular coupling being characterised in that the first and second components have the headed formation and socket shaped to enable introduction of the headed formation into the socket with the axis of the tubular male spigot extending transverse to the axis of the flow passage and wherein co-operating guide surfaces are provided on the headed formation and the socket with the guide surfaces being shaped to cooperate during rotation of the first and second components with the headed formation in the socket to bring the axes thereof into substantial alignment and wherein the seat and seal arrangement becomes operative with the axes of the first and second components in substantial alignment and the guide surfaces co-operate to hold the headed formation of the tubular male spigot axially captive relative to the socket.

Further features of this first aspect of the invention provide for the cooperating guide surfaces on the first and second components to be curved and to have a generally common centre about which the two components can be rotated relative to each other to bring the seat and seal arrangement into their co-operating positions; more particularly, for the cooperating guide surfaces to be part cylindrical or part spherical; and for the seat and seal arrangement to include a resiliently deformable seal carried either on a free end of the tubular male spigot or in a recess surrounding the flow passage such that the seal defines the seat, wherein the seal is preferably of squat cylindrical shape.

Yet further features of the invention provide for the seat to surround an opening where the flow passage communicates with the socket and for the seat to be optionally somewhat recessed such that a resiliently deformable seal carried by a tubular male spigot can move into its final position of registration with the seat without interference; for the socket and tubular male spigot to be shaped and dimensioned to snap into their final positions of registration such that a predetermined force must be exerted on the two components to cause them to rotate relative to each other in order to disengage the coupling; for a rotatable locking collar to be provided on the outside of the socket to selectively close a slot communicating between an entrance mouth to the socket and an opening for receiving the tubular spigot in its installed condition; and for the locking collar to have two terminal positions, one in which the slot is open and the first component can be engaged or disengaged with the second component, and one in which the slot is closed to prevent movement of the first component to disengage it from the second component.

A still further feature of this first aspect of the invention provides for the second component to have the flow passage form the interior of a connector spigot that preferably has at least one circumferential ridge on the outer surface thereof and a union nut that is preferably held captive on the connector spigot and wherein the union nut has an internal screw thread the diameter of which increases from the inner end of the union nut to the open end thereof which is directed towards the circumferential ridge such that the union nut when screwed onto a tube end that covers the circumferential ridge, the tube becomes clamped into sealing engagement with that ridge by rotation of the union nut with the thread of the union nut engaging, and preferably biting into, an outer surface of the tube.

In accordance with a second aspect of the invention there is provided an adapter for installation onto an existing coupling that has a connector spigot encircled by an O-ring to form a first component as envisaged above and wherein the connector spigot and adapter is adapted to be introduced axially into a cooperating socket in a second component and wherein the spigot has a shoulder located between the O-ring and an end of the connector spigot remote from a free end of the connector spigot, the adapter being of tubular shape and having an inner surface shaped to receive the connector spigot of an existing coupling and an outer surface configured to define, together with a connector spigot in the assembled position, a headed formation on a male tubular spigot capable of cooperating with the socket of a second coupling component to form a coupling as defined above.

The adapter may have a separate seal attached to an operatively free end thereof in order to cooperate with a seat provided around an opening whereby a flow passage through the second coupling component communicates with the socket.

It will be understood that the provision of an adapter of this nature makes the coupling and connector of the present invention fully compatible with existing systems such as the GARDENA® system.

The materials of construction of the various components of the coupling, adapter and connector defined above will be chosen according to the physical properties of the tubes or hoses being connected using determining factors that are well known in the art. Thus, for example, in application to garden hoses or many other flexible hoses, the materials of construction will typically be injection moulded plastics materials having suitable characteristics. On the other hand, should the invention be applied to copper or aluminium tubes, the materials of construction may well be brass or some other metal having suitable properties.

In the instance that injection moulded plastics components are employed, any union nuts or other components that need to be rotated about their own axis or anchored against rotation, can be arranged to be engaged manually by the provision of suitable external gripping formations, as may be appropriate.

Alternatively, they may be shaped for engagement by a suitable spanner or wrench that would apply especially to a metal component and metal tubes.

In order that the various aspects of the invention may be more fully understood, different embodiments thereof will now be described with reference to the accompanying drawings.

BRIEF DESCRIPTION OF THE DRAWINGS

In the drawings.

FIG. 7 is a sectional elevation of the second component of the coupling and showing a hose end aligned with the connector spigot in readiness for installation;

FIG. 8 is the same as FIG. 7 with the hose end connected;

DETAILED DESCRIPTION WITH REFERENCE TO THE DRAWINGS

Figure 1:
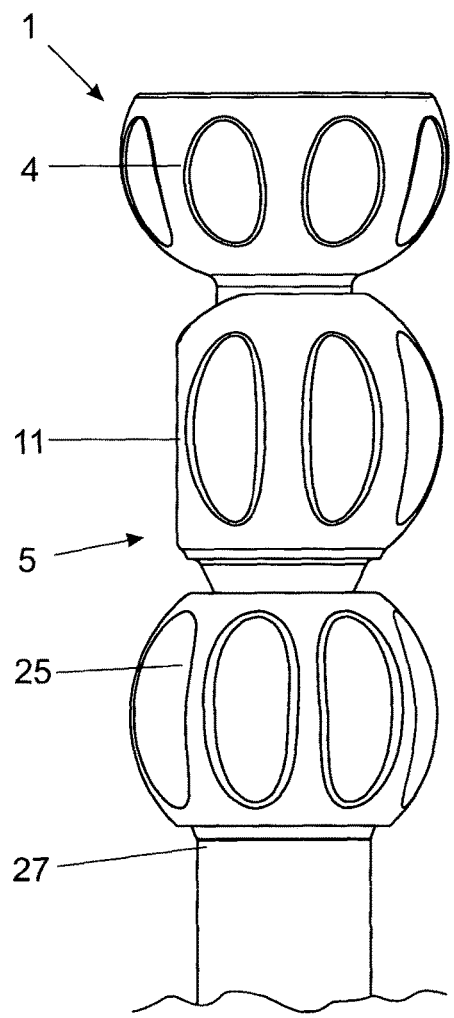
FIG. 1 is an elevation of one embodiment of quick release coupling and connector particularly suitable for use on garden hoses.
Figure 2:
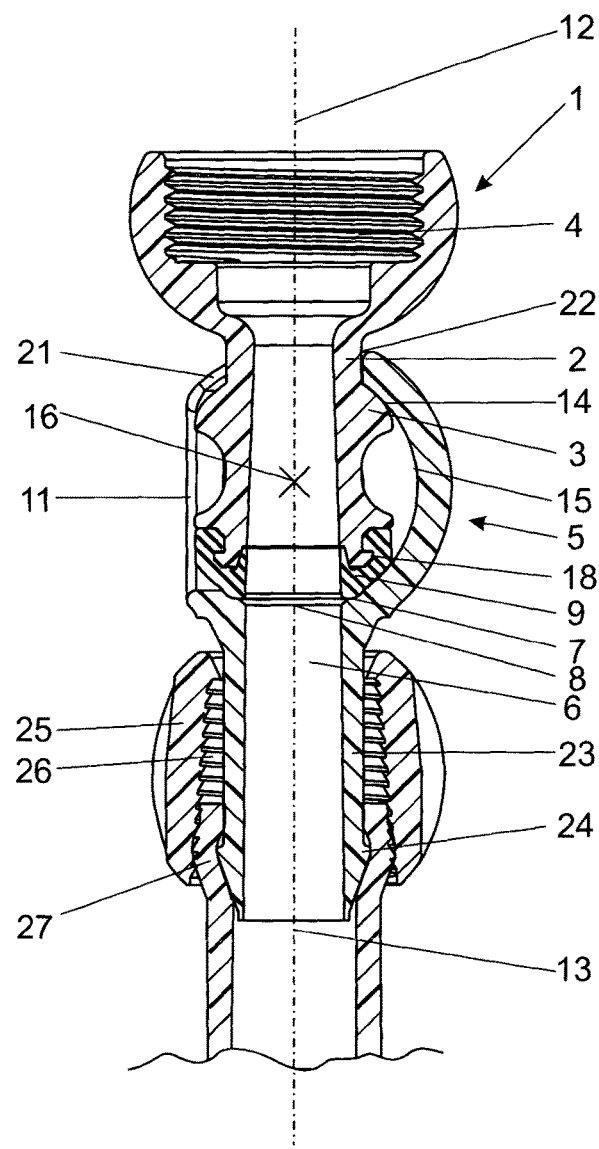
FIG. 2 is a sectional elevation thereof.
Figure 3:
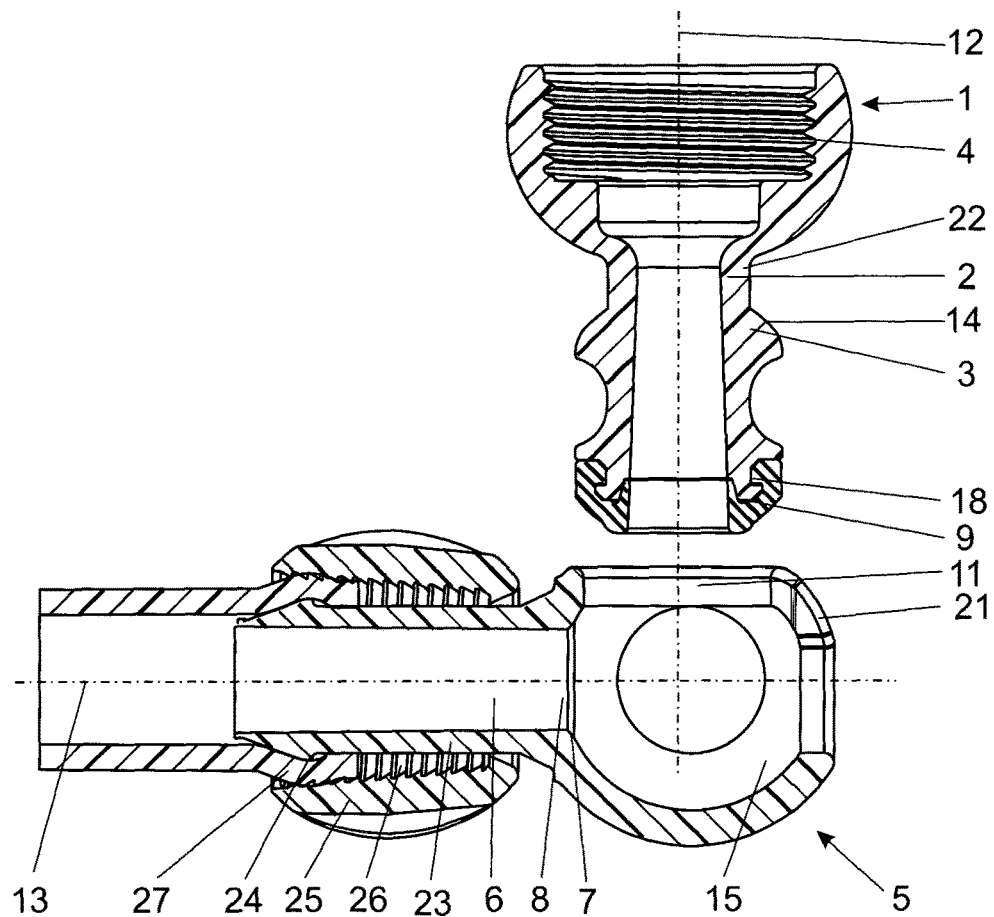
FIG. 3 illustrates, in section, first and second components of the coupling illustrated in FIGS. 1 and 2 in an exploded relationship immediately prior to inter-engagement.
Figure 4:
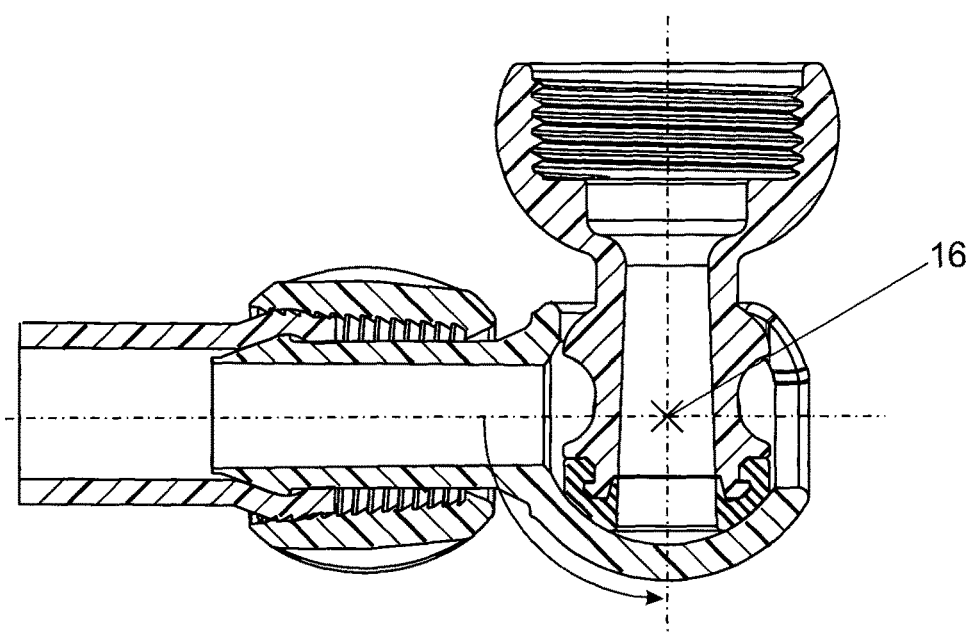
FIG. 4 illustrates, in section, the first and second components of the coupling illustrated in FIGS. 1 to 3 with the head of the male tubular spigot located within the socket.
Figure 5:
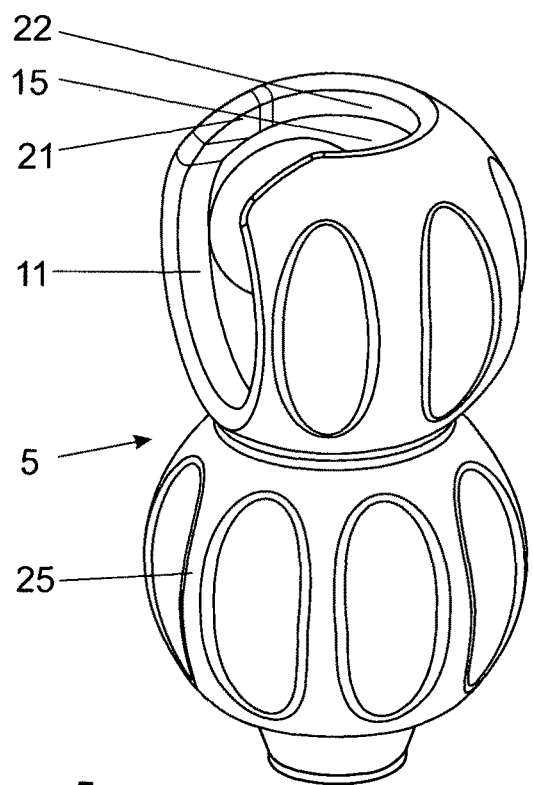
FIG. 5 is a three-dimensional view of the second component of the coupling illustrated in FIGS. 1 to 4.
Figure 6:
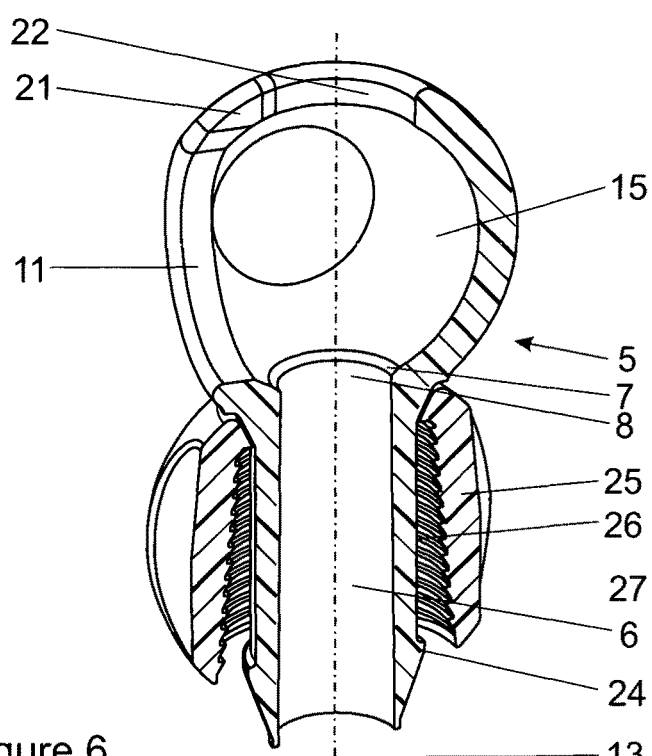
FIG. 6 is a sectional three-dimensional view of the second component illustrated in FIG. 5.
Figure 9:
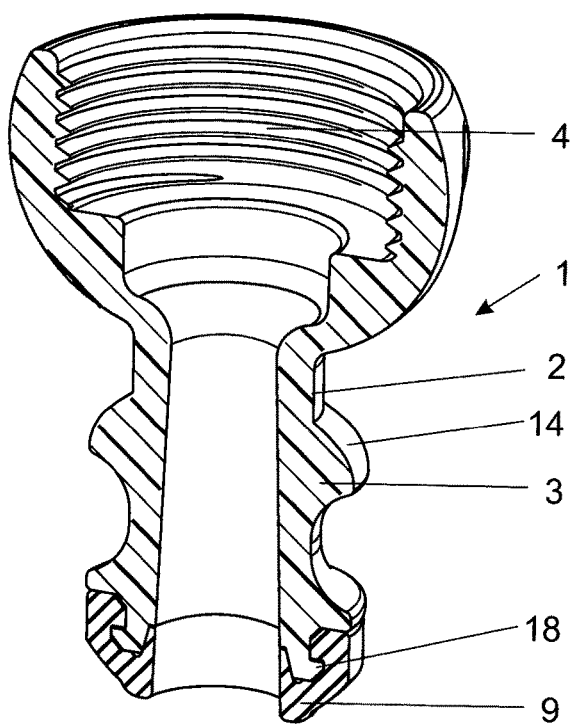
FIG. 9 is a sectional three-dimensional view of a tap connector having a tubular male spigot according to the invention.

Referring firstly to FIGS. 1 to 6 of the drawings and especially to FIGS. 1 to 4, one embodiment of tubular coupling comprises a first component (1) having a tubular male spigot (2) with a headed formation (3) on the outside thereof and extending towards one of its ends. A functional formation, in this instance a screw threaded socket (4) such as may be attached to a screw threaded spout of a tap, is located at the other end of the spigot.

A second component (5) has a socket for receiving the headed formation on the tubular male spigot in releasable manner. The second component has a flow passage (6) communicating with the socket generally collinearly with the tubular male spigot in the installed position.

A seat (7) is provided in the inner surface of the socket so that it encircles an opening (8) where it communicates with the socket and the tubular male spigot has a resilient seal (9) for sealing an adjacent end of the tubular male spigot to the flow passage.

The headed formation and the socket are shaped to provide guide surfaces enabling the introduction of the headed formation into the socket by way of a mouth (11) to the socket with the axis (12) of the tubular male spigot extending transversely at generally right angles to the axis (13) of the flow passage. These cooperating guide surfaces (14, 15) on the first and second components respectively are part spherical and have a generally common centre (16) about which the two components can be rotated relative to each other in order to bring the seat and seal arrangement into their co-operating positions.

In this embodiment of the invention the tubular male spigot carries a resiliently deformable seal (9) on its free end, the seal being of squat cylindrical shape and having an internal undercut that cooperates with a lip to retain the seal in position, as indicated by numeral (18). In the alternative, it is also possible to locate a seal in a recess surrounding the opening to the flow passage through the second component in which instance the seal would define the seat.

The seat that surrounds the opening (8) may be somewhat recessed such that the resiliently deformable seal carried by the tubular male spigot can move into its final position of registration with the seat without interference.

The guide surfaces cooperate such that rotation of the first and second components to bring their axes into substantial alignment causes the seat and seal arrangement to become operative and the headed formation of the tubular male spigot to be held axially captive relative to the socket. The seal will be slightly resiliently compressed in the installed condition.

The socket and tubular male spigot are dimensioned to snap into their final positions of registration such that a predetermined force must be exerted on the two components to cause them to rotate relative to each other in order to disengage the coupling. This is conveniently achieved by providing a slightly narrowed slot (21) communicating between the mouth to the socket and an opening (22) diametrically opposite the opening communicating with the flow passage (6). This arrangement enables the flow passage through the coupling to be straight.

Referring more particularly to FIGS. 7 and 8 of the drawings, in this embodiment of the invention the second component has the flow passage forming the interior of a connector spigot (23) that preferably has at least one circumferential ridge (24) on the outer surface thereof and a union nut (25) that is held captive on the connector spigot. The union nut has an internal screw thread (26) the diameter of which increases from the inner end of the union nut to the open end thereof which is directed towards the circumferential ridge. The screw thread thus follows a truncated conical path of small cone angle with the cone angle selected to provide a suitable locking engagement with the outer surface of the hose. The cone angle will accordingly depend at least to some extent on the physical properties of the materials concerned.

The arrangement is such that the union nut, when screwed onto a hose end (27) that covers the circumferential ridge, causes the hose to become clamped into sealing engagement with the ridge by rotation of the union nut with the thread of the union nut biting into an outer surface of the tube. It should be noted that tension applied to the hose, if it tends to move the hose off the connector spigot, will pull the union nut with it which will tend to tighten the connection.

Figure 11:
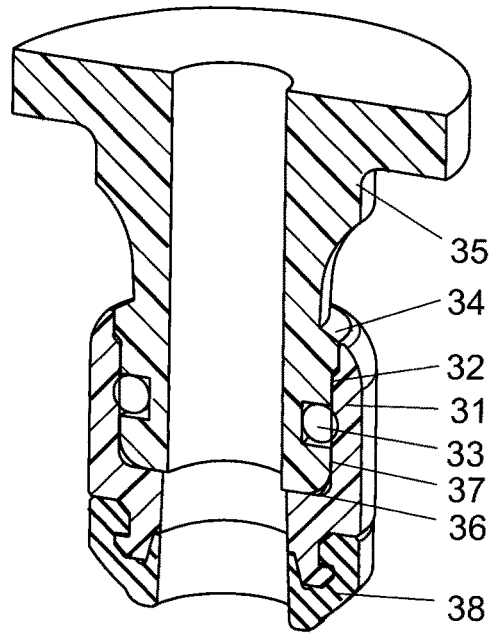
FIG. 11 is a sectional three-dimensional view of the adapter and fitting illustrated in FIG. 10 in the assembled condition.
Figure 10:
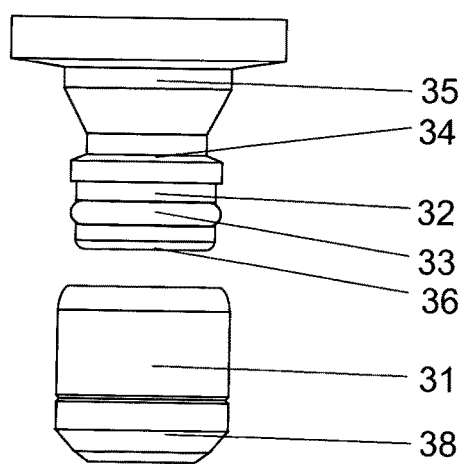
FIG. 10 is an exploded elevation showing an adapter according to the invention in exploded relationship relative to a fitting forming part of an existing hose connection system.
Figure 12:
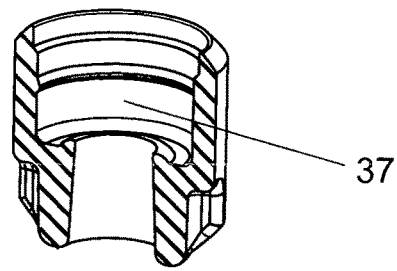
FIG. 12 is a sectional three-dimensional view of an adapter alone.

Referring now to FIGS. 10 to 12 of the drawings an adapter is also provided by the invention to enable couplings and connectors according to this invention to integrate fully with the industry standard GARDENA® type of systems. As shown, an adapter (31) is provided for installation onto of an existing coupling having a connector spigot (32) encircled by an O-ring (33). As is well known in the art, the connector spigot is adapted to be introduced axially into a cooperating socket in a second coupling component that is not shown. The spigot has a shoulder (34) located between the O-ring and the end (35) of the connector spigot remote from a free end (36) thereof. The adapter is of tubular shape and has an inner surface (37) shaped to receive the connector spigot of the existing coupling in sealing relationship. The outer surface of the adapter is configured to define, together with the connector spigot in the operative position, a first component of a coupling as described above with a headed formation on the male tubular spigot capable of cooperating with the socket of a second coupling component according to this invention as described above.

The one end of the adapter remote from the seal (38) is shaped to merge with the shoulder (34) of the existing spigot so that, in effect, the combination of the adapter and the prior art connector spigot forms a headed formation for cooperation with the socket of the second coupling component according to this invention.

The adapter may have a separate seal (38) attached to an operatively free end thereof in order to cooperate with a seat provided around an opening whereby a flow passage through the second coupling component communicates with the socket, as shown in FIG. 11. Alternatively, the adapter may be a single piece moulding of an appropriate material, as shown in FIG. 12.

It will be understood that the provision of an adapter of this nature makes the coupling and connector of the present invention fully compatible with existing systems such as the GARDENA® type of system.

Referring to FIGS. 13 to 16 of the drawings, in the event that a more positive lock is required for maintaining a coupling of the type provided by this invention in the assembled condition, a locking collar in the form of a generally hemispherical injection moulded plastics dome (41) may be employed. The outer surface of the socket is made such that the hemispherical dome clips onto it in an inclined orientation so that it is rotatable about its own axis (42) that is inclined in a plane cutting centrally through the mouth (43) of the coupling in the assembled condition. The axis can be inclined to the axis of the second component at an angle of say about 40° or any other convenient angle.

Figures 13, 14:
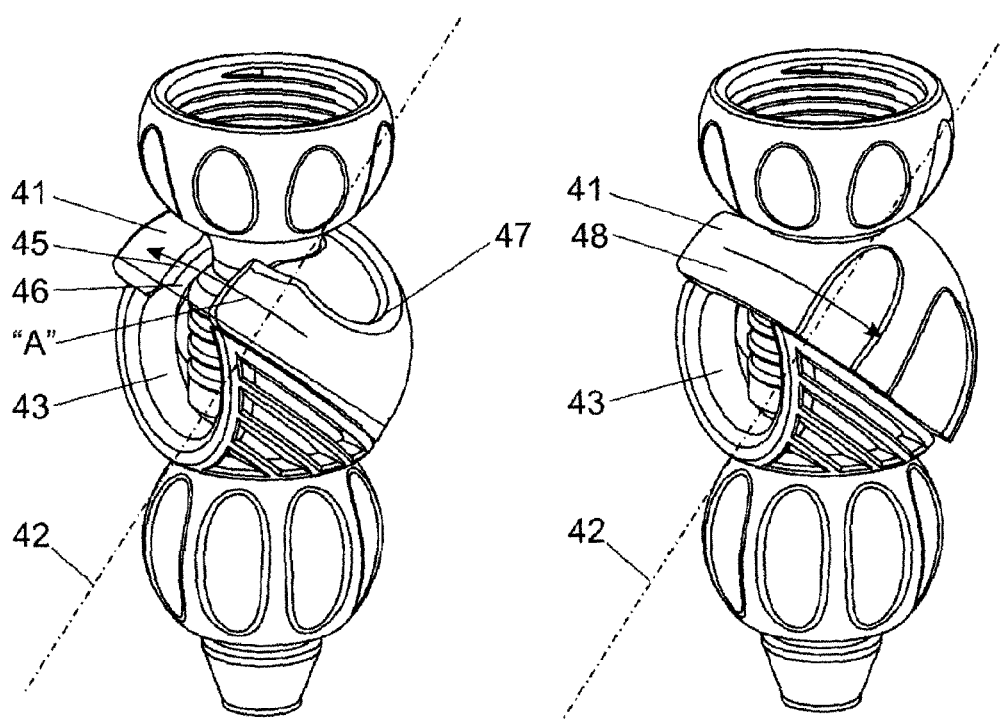
FIG. 13 is a three dimensional view of a coupling fitted with a locking collar wherein the locking collar is in an unlocked position.
FIG. 14 is a three dimensional view of the coupling illustrated in FIG. 13 wherein the locking collar is in a locked position.
Figures 15, 16:
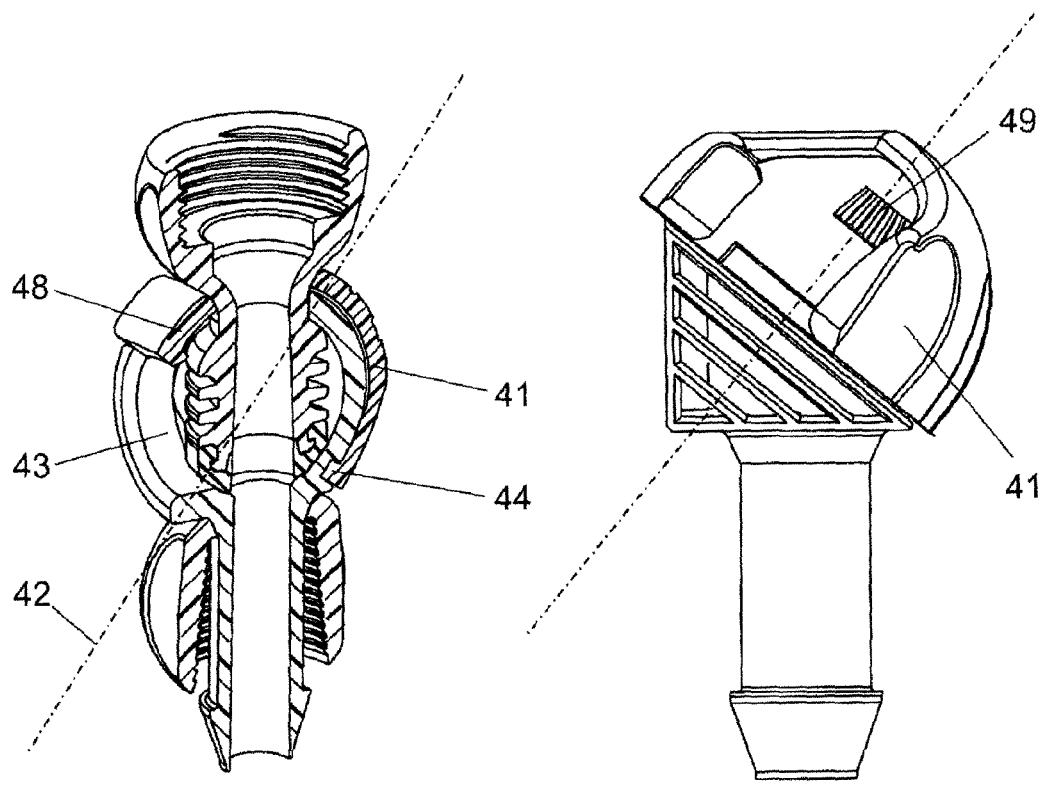
FIG. 15 is a three dimensional longitudinal section taken through the coupling illustrated in FIG. 14; and, FIG. 16 is a side view of the second component of the coupling illustrated in FIGS. 13 to 15 showing the formations that hold the locking collar in its terminal positions.

The locking collar has one or more projections that follow a circumferential groove in the outer surface of the second component as indicated by numeral (44) in FIG. 15. An opening (45) in the periphery of the dome aligns, in one terminal angular position of the locking collar, with the narrowed slot (46) that provides a path for the male spigot when it is rotated from its position at roughly right angles to the second component to a position in which it is generally collinear therewith. This position corresponds to the unlocked position of the locking collar and is as illustrated in FIG. 13. In this position the male spigot is accommodated in an aperture in the dome that merges with the opening (45) and has a lateral extension (47) the purpose of which as will become more apparent from the following.

The locking collar is rotatable about its axis to a second terminal position, namely the locked position as illustrated in FIGS. 14 and 15 and as indicated by arrow "A", in which the periphery of the lateral extension (47) of the aperture closely encircles the spigot of the first component and the dome closes the slot (46) in the second component as indicated by numeral (48). In this locked position, the first component cannot be disengaged from the second component.

In order to ensure that the locking collar remains in the selected angular position, a series of teeth (49) is provided on the outer surface of the socket and is engaged by a pawl integral with the locking collar. The teeth and pawl interact to impose a drag on the rotation of the locking collar between its two terminal positions and to maintain it in a selected terminal position.

It should be noted that with a coupling and connector as described above, the hose may still be rotated about the axis of the assembled coupling. It should also be noted that the coupling components according to this invention, may have no moving parts and in such instances therefore do not suffer from disadvantages that may be associated with moving parts.

It should also be noted that the seal in the coupling described above can generally be designed to flex so that the sealing is enhanced by an increase in pressure in the interior thereof.

It is nevertheless within the scope of this invention that the cooperating guide surfaces of the headed formation and socket need not be part spherical but may be of a different shape, for example part ellipsoidal or part cylindrical, or any other shape that would allow the swiveling action of the first coupling component relative to the second coupling component during assembly of the coupling components into the operative relationship. Some of such shapes of the cooperating guide surfaces may not allow relative rotation of the first and second components of the coupling.

It should also be noted that the invention is presently considered to be particularly appropriate to use in relation to garden hoses as well as flexible hydraulic and pneumatic hoses.

It will be understood that numerous variations may be made to the embodiments of the various aspects of the invention described above without departing from the scope hereof.

The invention claimed is:

1. A tubular coupling comprising a first component having an axis and comprising a tubular male spigot with a headed formation on the outside thereof and a second component having an axis and comprising a socket for receiving the headed formation on the tubular male spigot in releasable manner and a flow passage communicating with the socket and collinearly with the axis of the tubular male spigot in the installed position, wherein co-operating guide surfaces are provided on the headed formation and the socket with the guide surfaces being of part spherical or part cylindrical shape centered at a common center about which the two components can be rotated relative to each other in order to bring the axes of the first and second components in alignment and the guide surfaces co-operate to hold the headed formation of the tubular male spigot axially captive relative to the socket, wherein the first and second components have the headed formation and socket shaped to enable introduction of the headed formation into the socket by way of a mouth to the socket with the tubular male spigot being configured to be moved along its own axis when it is arranged transversely at right angles to the axis of the flow passage through the socket with these axes intersecting at the common center and wherein an opening diametrically opposite the flow passage receives the tubular male spigot in the installed position thereof, and wherein a cooperating seat and seal arrangement is provided for sealing an adjacent end of the tubular male spigot to the flow passage where it communicates with the socket, with the seat and seal arrangement including a resiliently deformable seal carried either on a free end of the tubular male spigot or in a recess surrounding the flow passage in the socket such that the seal defines the seat, wherein in the installed position the seal is positioned at the longitudinally outermost free end of the spigot and extends to the seat of the socket.

2. A tubular coupling as claimed in claim 1 in which the seat surrounds an opening where the flow passage communicates with the socket.

3. A tubular coupling as claimed in claim 2 in which the seat is somewhat recessed such that a resiliently deformable seal carried by a tubular male spigot can move into its final position of registration with the seat without interference.

4. A tubular coupling as claimed in claim 1 in which the socket and tubular male spigot are shaped and dimensioned to snap into their final positions of registration such that a predetermined force must be exerted on the two components to cause them to rotate relative to each other in order to disengage the coupling.

5. A tubular coupling as claimed in claim 1 in which a rotatable locking collar is provided on the outside of the socket to selectively close a slot communicating between an entrance mouth to the socket and an opening for receiving the tubular spigot in its installed condition.

6. A tubular coupling as claimed in claim 5 in which the locking collar has two terminal angular positions, one in which the slot is open and the first component can be engaged or disengaged with the second component, and one in which the slot is closed to prevent movement of the first component to disengage it from the second component.

7. A tubular coupling as claimed in claim 1 in which the second component has the flow passage in the form of the interior of a connector spigot that has at least one circumferential ridge on the outer surface thereof and a union nut on the connector spigot and wherein the union nut has an internal screw thread the diameter of which increases from the inner end of the union nut to the open end thereof which is directed towards the circumferential ridge such that the union nut when screwed onto a tube end that covers the circumferential ridge, the tube becomes clamped into sealing engagement with that ridge by rotation of the union nut with the thread of the union nut engaging, and biting into, an outer surface of the tube.

8. A tubular coupling as claimed in claim 1 in which the first component comprises an adapter installed onto an existing coupling that has a connector spigot encircled by an O-ring wherein the spigot has a shoulder located between the O-ring and an end of the connector spigot remote from a free end of the connector spigot, the adapter being of tubular shape and having an inner surface receiving the connector spigot of the existing coupling and an outer surface defining, together with the connector spigot, a headed formation on a male tubular spigot capable of cooperating with the socket of a second coupling component to form the coupling.

9. A tubular coupling as claimed in claim 8 in which a separate seal is attached to an operatively free end of the adapter in order to cooperate with a seat provided around an opening whereby a flow passage through the second coupling component communicates with the socket.

10. A tubular coupling as claimed in claim 1 in which the resiliently deformable seal is carried on the free end of the tubular male spigot and wherein the resiliently deformable seal is located at the outermost portion of the said free end of the tubular male spigot.

11. A tubular coupling as claimed in claim 1 in which the seal is of squat cylindrical shape and has an internal undercut that cooperates with a lip to retain the seal in position.

12. A tubular coupling as claimed in claim 1 in which the headed formation and the socket are shaped to provide the guide surfaces.

* * * * *